United States Patent [19]
Recht et al.

[11] Patent Number: 5,841,851
[45] Date of Patent: Nov. 24, 1998

[54] METHOD OF AND APPARATUS FOR CONTROLLING OPERATION OF A MULTI-LINE TELEPHONE APPARATUS

[75] Inventors: Thomas Stuart Recht, Glencoe; James Francis Goedken, Arlington Height, both of Ill.

[73] Assignee: Motorola, Inc., Schaumburg, Ill.

[21] Appl. No.: 546,460

[22] Filed: Oct. 20, 1995

[51] Int. Cl.$^6$ .................................................. H04M 1/00
[52] U.S. Cl. .................... 379/156; 379/164; 379/165; 379/377
[58] Field of Search ........................ 379/156, 164–165, 379/377, 58, 59, 60, 211–212, 21, 27, 33; 455/403, 414–417, 418, 421, 423

[56] References Cited

U.S. PATENT DOCUMENTS

| | | | |
|---|---|---|---|
| 4,490,583 | 12/1984 | Bednarz et al. | |
| 4,588,862 | 5/1986 | Grabowy | 379/21 |
| 4,791,658 | 12/1988 | Simon et al. | 379/41 |
| 4,817,132 | 3/1989 | Chamberlain et al. | |
| 5,386,460 | 1/1995 | Boakes et al. | 379/142 |
| 5,390,233 | 2/1995 | Jensen et al. | 379/58 |
| 5,471,525 | 11/1995 | Domoto et al. | 379/142 |
| 5,590,185 | 12/1996 | Sandler et al. | 379/164 |

OTHER PUBLICATIONS

Meridian Business Set M5312 User Guide, Northern Telecom, Sep. 1988, 41 pages.

*Primary Examiner*—Curtis A. Kuntz
*Assistant Examiner*—Duc Nguyen
*Attorney, Agent, or Firm*—John J. King; John J. Oskorep

[57] ABSTRACT

A telephone apparatus includes a phone jack arrangement (299) providing an interface to land lines from the central office and other telephone apparatuses. Phone jack arrangement (299) comprises a phone jack (306) having inner conductors (420, 422) coupled to outer conductors (406, 408) of a phone jack (304), and outer conductors (424, 426) coupled to inner conductors (402, 404) of phone jack (304). Condition detectors (232, 234) detect whether phone lines of phone line circuitry (270) are connected to land lines, and microprocessor (212) may operate the telephone apparatus or configure base station user interface (126) accordingly. A two-line operating mode may select one of the phone lines for operating use upon detection of a predetermined condition from condition detectors (232, 234) or ring detectors (246, 248). Thus, a multi-line telephone apparatus operates flexibly according to different phone line connections.

7 Claims, 8 Drawing Sheets

METHOD OF AND APPARATUS FOR CONTROLLING OPERATION OF A MULTI-LINE TELEPHONE APPARATUS

FIELD OF THE INVENTION

The present invention relates generally to a communication device, and more particularly to a multi-line telephone apparatus.

BACKGROUND OF THE INVENTION

Phone line circuitry in a telephone apparatus connects to a central office in a telephone network (or other switching system such as a local PBX) via a land line comprising a pair of conductors commonly referred to as a tip and ring pair. Equipment of the central office supplies an operating line voltage, typically a nominal −48 or −24 volts, across the tip and ring of the land line. When a receiver of the telephone apparatus is taken "off-hook" by a user who is about to place a phone call, the telephone apparatus connects an impedance between the tip and ring, and thereby establishes a loop which alters the operating line voltage. When the receiver remains "on-hook," the loop is not established. Since many telephone apparatuses have provided different means for connecting and disconnecting such loops with land lines (e.g., pressing a line switch, opening a cover element, etc.), a phone line in the telephone apparatus is considered off-hook when a loop is established with circuitry of the phone line, and on-hook when not.

When the phone line is taken off-hook initially, a dial tone from the central office is heard through a speaker of the telephone apparatus. At this time, a phone call may be placed. Alternatively, when a phone call is waiting for the telephone apparatus, the central office will vary the potential between the tip and ring in a periodic fashion, generating a ringing condition on the phone line. The ringing condition is detected in the telephone apparatus, which then typically generates an audible and/or visual signal to indicate that a phone call is being received. The user may answer the phone call by taking the phone line off-hook.

Useful features are typically provided in the telephone apparatus. For example, the telephone apparatus may allow the user to put the phone line on "hold" during a phone call. When the phone line is placed on hold, the telephone apparatus mutes audible communications between the user and a party on the phone line while maintaining the connection with the land line. When a hold condition is removed from the phone line (i.e. the phone line is no longer on hold), the audible communications is reestablished. Another feature, "conference calling," is often provided in a multi-line telephone apparatus having at least a first phone line and a second phone line. A conference call typically provides a communications connection (or conference call connection) between three parties: the user of the multi-line telephone apparatus, a first party on the first phone line, and a second party on the second phone line. Each party included in the conference call can communicate to all other parties.

The multi-line telephone apparatus typically includes a phone jack arrangement comprising a first phone jack and a second phone jack. The phone jack arrangement provides an interface for the connection of the first and second phone lines to land lines and telephone accessories. Making such connections includes the use of at least one telephone cord, typically comprising a plurality of line conductors coupled to a first phone plug on one end and coupled to a second phone plug on another end. The phone jacks and phone plugs are designed such that, given proper insertion, a mechanical and an electrical coupling will occur between a similar phone jack and phone plug. For specifications and configurations of phone jacks and phone plugs, see Title 47, Code of Federal Regulations, Section 68.500.

Some phone jacks, land line jacks, and telephone cords are capable of providing two-line connections, whereas others are only capable of providing one-line connections. A conventional phone jack arrangement includes a first phone jack for providing a two-line connection with the first and second phone line, and a second phone jack for providing a one-line connection with the first phone line. Given this configuration, the first and second phone lines may be "connected" to a first land line and second land line in one of two ways. First, the two phone lines may be connected by inserting the first plug of a first one-line cord into the first phone jack and a second plug of the first one-line cord into a first one-line land line jack, and also inserting the first plug of a second one-line cord into the second phone jack and the second plug of the second one-line cord into a second one-line land line jack. Alternatively, the two phone lines may be connected by inserting the first plug of a two-line cord into the first phone jack and the second plug of the two-line cord into a two-line land line jack.

The multi-line telephone apparatus is also intended to provide connections to a telephone accessory, such as a telephone answering machine that answers phone calls and records messages left by callers. Given the conventional phone jack arrangement described above, the two phone lines of the telephone apparatus and the telephone accessory may be connected by inserting the first plug of a one-line cord into the second phone jack and the second plug of the one-line cord into a phone jack of the telephone accessory, and inserting a first plug of a two-line cord into the first phone jack and a second plug of the two-line cord into a two-line land line jack.

However, it is easy to make improper connections with the multi-line telephone apparatus having the conventional phone jack arrangement, especially for users who do not read provided instruction manuals. For example, if both phone lines are desired to be connected, and a user connects a two-line cord into the second phone jack of a conventional phone, only the second phone line will function. Also, if only one phone line of the multi-line telephone apparatus is intended to be used, and a user establishes a connection using a one-line cord into the first phone jack of a conventional telephone, a second display and a second switch associated with the second phone line will continue to operate as if the second phone line was in use. Finally, where the first phone jack is used to connect one or more of the phone lines, a telephone accessory connected to the second phone jack is limited to the use of the one phone line that is provided by the second phone jack.

Other conventional phone jack arrangements provide a switch for the second phone jack, allowing a user to select which one-line connection is preferred (the first or second phone line). For example, the switch provides for a selection between which phone line will be answered by a telephone answering machine connected to the second phone jack. However, switches are inconvenient, confusing, and ignored by most users, and are also expensive. Also, where the first phone jack is used to connect one or more of the phone lines, the second phone jack still only provides a one-line connection, even when a user wishes to use a multi-line telephone accessory.

Generally, conventional multi-line telephone apparatuses do not adapt to varying phone line connections. Accordingly, there is a need for a multi-line telephone apparatus which provides greater flexibility when different line connections are made.

DETAILED DESCRIPTION OF A PREFERRED EMBODIMENT

A telephone apparatus includes a phone jack arrangement 299 providing an interface to land lines from the central office and other telephone apparatuses. Phone jack arrangement 299 comprises a phone jack 306 having inner conductors 420, 422 coupled to outer conductors 406, 408 of a phone jack 304, and outer conductors 424, 426 coupled to inner conductors 402, 404 of phone jack 304. Condition detectors 232, 234 detect whether phone lines of phone line circuitry 270 are connected to land lines, and microprocessor 212 may operate the telephone apparatus or configure a base station user interface 126 accordingly. A two-line operating mode may select one of the phone lines for operating use upon detection of a predetermined condition from condition detectors 232, 234 or ring detectors 246, 248. Thus, a multi-line telephone apparatus operates flexibly according to different phone line connections.

Figure 1:
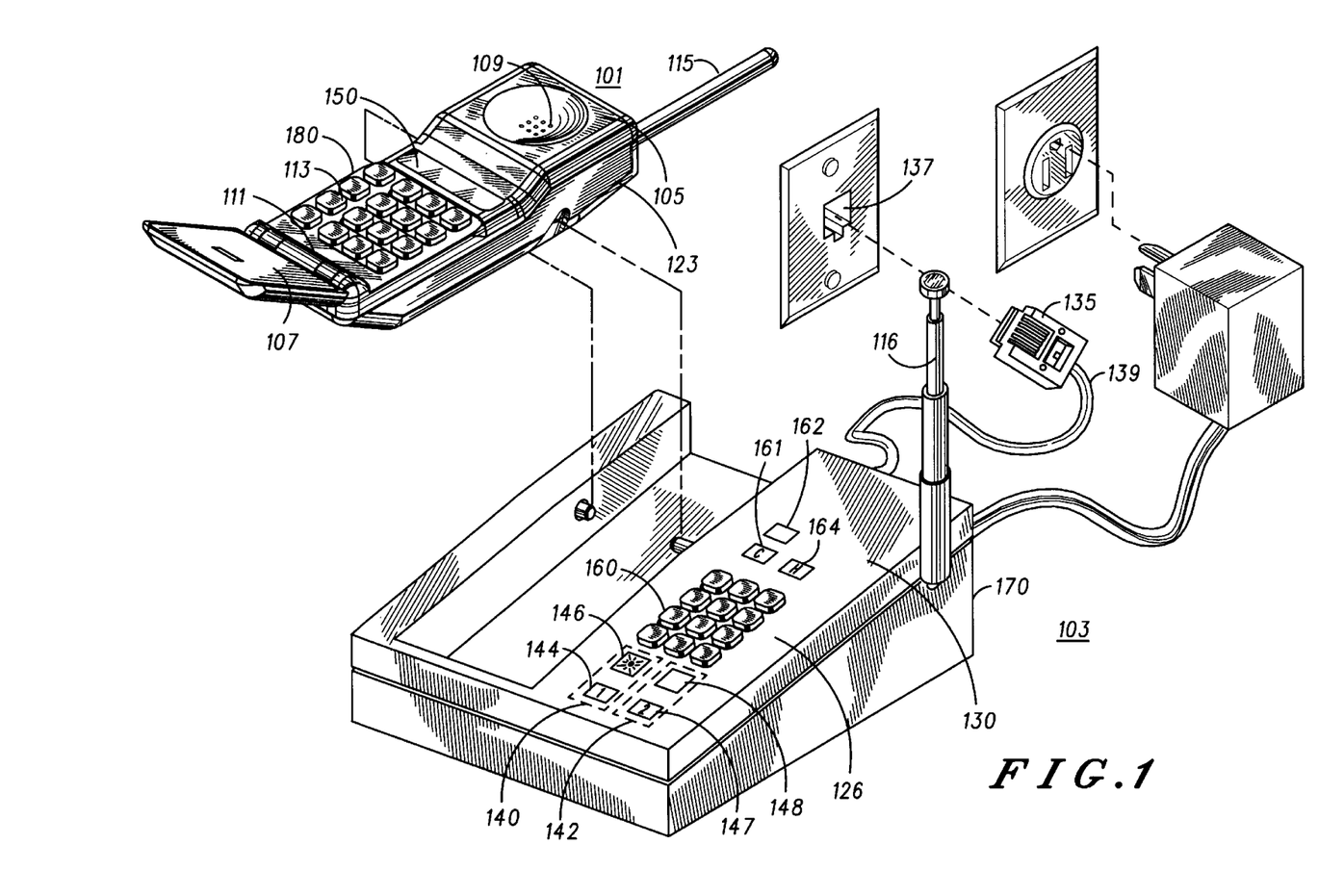
FIG. 1 is a plan view of a telephone apparatus in accordance with the present invention.

Referring to FIG. 1, a telephone apparatus which could incorporate the present invention is shown. The telephone apparatus of FIG. 1 comprises a handset 101 and base station 103. Handset 101 consists of two external portions, a body portion 105 and a cover element 107. The drawing of FIG. 1 shows cover element 107 in an "open" position such that the user of handset 101 may listen via an earpiece 109 and may speak into a microphone 111. A handset user interface 180 comprises a handset keypad 113 and a handset display 150. Handset keypad 113 comprises conventional keys and also has additional function keys such as channel select and volume control buttons. Handset display 150 is optional and provides illuminated messages including confirmation of most conventional key presses. Although handset 101 is shown is a cordless handset, handset 101 could be a corded handset according to the present invention.

Base station 103 optionally includes base station user interface 126, comprising a base station conventional keypad 160, a first line interface 140, and a second line interface 142. The first line interface 140 comprises a LINE 1 key 144 and a LINE 1 display 146, and the second line interface 142 comprises a LINE 2 key 147 and a LINE 2 display 148. Base station user interface 126 further includes a CONFERENCE key 160, a HOLD key 164, and an OFF key 162. When depressed, a LINE 1 key 144 and a LINE 1 key 147 may bring a phone line off-hook for operating use. The LINE 1 display 146 and LINE 2 display 148 provide indications corresponding to conditions or activity occurring on the phone lines.

Figure 2:
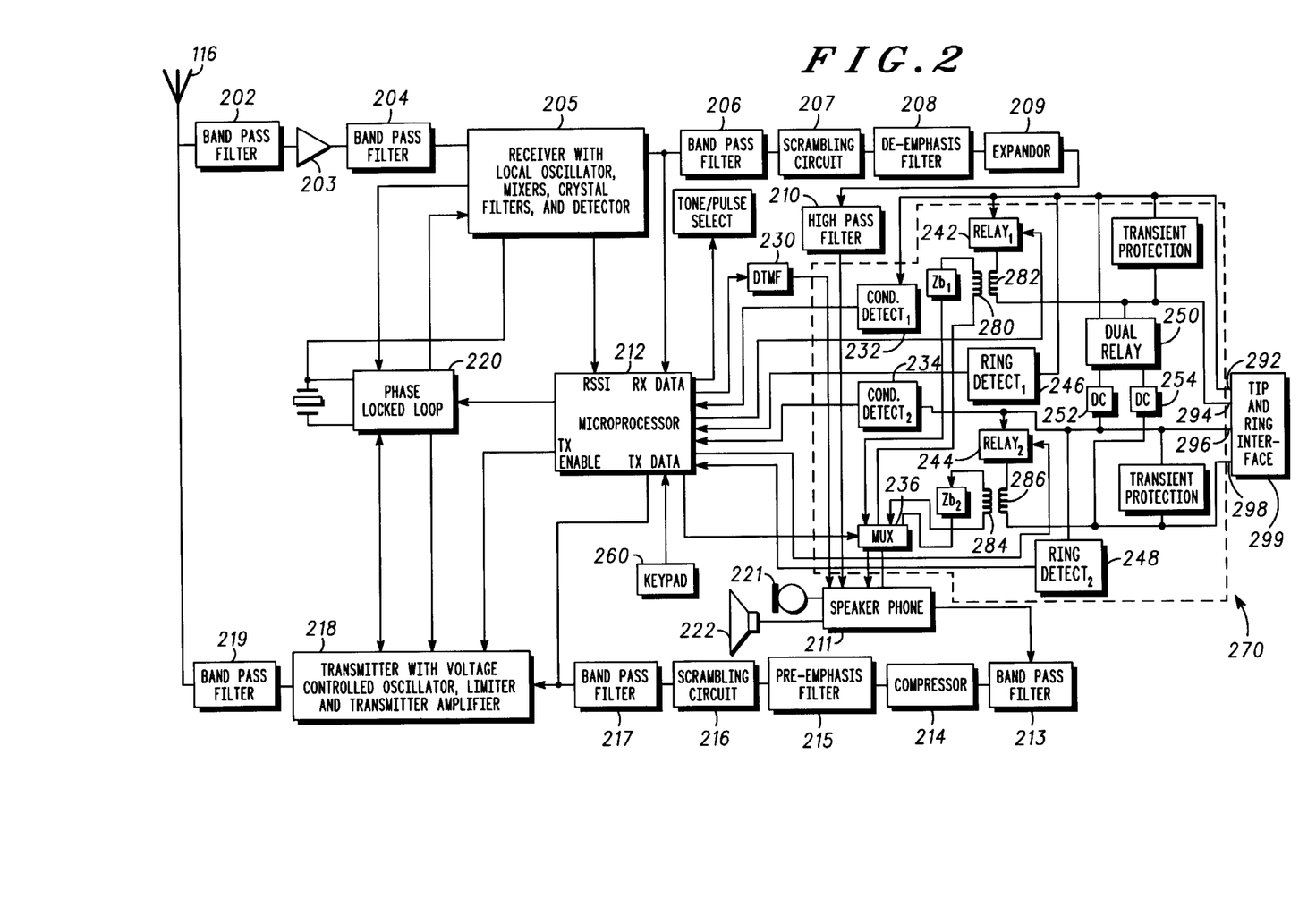
FIG. 2 is a circuit diagram of base station 103 of the telephone apparatus of FIG. 1.

Referring to FIG. 2, a circuit diagram of base station 103 of FIG. 1 is shown. Base station 103 is comprised of base station antenna 116 that is coupled to receive and transmit paths of base station 103. RF communication is provided between base station 103 and handset 101 through base station antenna 116 and a handset antenna 115. The receive path is comprised of a first bandpass filter 202 that allows the frequencies of 49.670–49.990 MHz to pass. First bandpass filter 202 is connected to a receive amplifier 203 that amplifies the filtered signal by approximately 18 dB. The output of receive amplifier 203 is then filtered by a second bandpass filter 204 before being input to a receiver 205. In the preferred embodiment, receiver 205 is an MC3363 available from Motorola, Inc.

Receiver 205 mixes the signal down to 10.7 MHz and then to 455 kHz. This signal is then demodulated. The local oscillators in receiver 205 are controlled by a phase locked loop 220 whose frequency is controlled by a microprocessor 212. Microprocessor 212 also receives a carrier detect signal and the demodulated signal from receiver 205. The demodulated signal is used by microprocessor 212 to interpret coded data messages transmitted by the remote unit. These coded data messages are used for DTMF dialing, telephone hook switch control, and control of the scrambling circuit. The carrier detect signal is used to detect the presence of a transmitter occupying a receive channel of base station 103. In the preferred embodiment, microprocessor 212 is an MC68HCL05C4 available from Motorola, Inc.

The output of receiver 205 is filtered again by a third bandpass filter 206. The output of third bandpass filter 206 is input to a scrambling circuit 207. In the preferred embodiment, scrambling circuit 207 is an MX108DW Full-Duplex Voiceband Scrambler integrated circuit available from MX·Com, Inc.

The unscrambled output of scrambling circuit 207 is filtered in a de-emphasis filter 208 before being input to an expander 209. The expansion process applies gain to the input signal that is varied as a function of the signal magnitude, the effective gain being greater for large magnitude signals and less for small magnitude signals. After this signal has been filtered by a highpass filter 210, it is input to a speakerphone circuit 211. If a speakerphone mode is active in base station 103, speakerphone circuit 211 provides the signal as an output to a speaker 222 of speakerphone circuit 211.

The transmit path of base station 103 is comprised of audio signals from a microphone 221 of speakerphone circuit 211 and phone line circuitry 270, signals which are filtered through a fourth bandpass filter 213 before going through a compressor 214. Compressor 214 applies gain to the audio signals that are varied as a function of the signal magnitude, the effective gain being greater for small signals. An example of a compandor (compressor/expander) is MC33110 manufactured by Motorola, Inc. The dynamic range of the compandor is 80 dB.

The output of compressor 214 is input to a pre-emphasis filter 215 before being scrambled by a scrambling circuit 216. Scrambling circuit 216 is the second half of the same integrated circuit used to unscramble the received signal. The scrambled audio signal is filtered by a fifth bandpass filter 217 before being modulated by the transmitter 218 to a frequency in the range of 46.610–46.970 MHz. The actual frequency used by the telephone apparatus can be user selectable by a switch or other control (not visible) on base station 103 or handset 101. Both the receive and transmit frequency ranges are set by the Federal Communications Commission (FCC) for all telephone apparatuses which are cordless. An example of a transmitter is MC2833, manufactured by Motorola, Inc. The output of transmitter 218 is filtered by a fifth bandpass filter 219 to filter out the signal outside the 46.610–46.970 MHz range. This signal is then transmitted from base station antenna 116 to handset antenna 115.

Base station 103 further comprises phone line circuitry 270 providing for the first and second phone lines, each line providing a separate channel for communication. Phone line circuitry 270 of base station 103 is coupled to land lines from the central office through a phone jack arrangement 299 (also shown in FIG. 4 and FIG. 5). Tip and ring lines 292, 294, respectively, of the first phone line may be coupled to tip and ring lines of a first land line from the central office through phone jack arrangement 299. Likewise, tip and ring lines 296, 298, respectively, of the second phone line may be coupled to tip and ring lines of a second land line from the central office through phone jack arrangement 299.

The following description assumes that phone line circuitry 270 is coupled to both the first and second land lines. For the first phone line, tip line 292 is coupled to a first relay 242 which is coupled to one end of a first inductor 282, and ring line 294 is coupled to another end of first inductor 282. When the first phone line is taken off-hook by the user, microprocessor 212 controls first relay 242 to couple tip line 292 to first inductor 282, establishing an electrical loop or connection with the first land line. Since first inductor 282 is magnetically coupled to a second inductor 280, signals from the first land line are input to a multiplexer 236 when the loop is established. Microprocessor 212 controls multiplexer 236 to output these signals to fourth bandpass filter 213 for transmission and also to speaker 222 when speakerphone mode is active. At the same time, microprocessor 212 controls multiplexer 236 to feed the signals from highpass filter 210 and microphone 221 of speakerphone circuit 211 (when speakerphone mode is active) to second inductor 280, where, through the magnetic coupling of first inductor 282, the signals reach the first land line.

Thus, a duplex communications connection may be established between the user of the first phone line and the first party of the first land line.

For the second phone line, tip line 296 is coupled to a second relay 244 which is coupled to one end of a third inductor 286, and ring line 298 is coupled to another end of third inductor 286. When the second phone line is taken off-hook by the user, microprocessor 212 controls second relay 244 to couple tip line 296 to third inductor 286, establishing an electrical loop or connection with the second land line. Since third inductor 286 is magnetically coupled to a fourth inductor 284, signals from the second land line are input to multiplexer 236 when the loop is established. Microprocessor 212 controls multiplexer 236 to output these signals to fourth bandpass filter 213 for transmission and also to speaker 222 when speakerphone mode is active. At the same time, microprocessor 212 controls multiplexer 236 to feed the signals from highpass filter 210 and microphone 221 of speakerphone circuit 211 (when speakerphone mode is active) to fourth inductor 284, where, through the magnetic coupling to third inductor 286, the signals reach the second land line. Thus, a duplex communications connection may be established between the user of the second phone line and the second party of the second land line.

Several other types of communications connections may be made using the telephone apparatus. A three-way connection between a user of handset 101, a user of base station 103, and a party on one of the phone lines can be established. Also, a conference call connection, as described above, may be made. During a conference call connection, microprocessor 212 controls first and second relays 242, 244 to maintain connections to both the first and second phone lines, a dual relay 250 to couple the first and second phone lines together, and multiplexer 236 to output signals from both phone lines to speakerphone circuit 211. The conference call connection may be a four-way connection including the user of handset 101, the user of base station 103, a party on the first phone line, and a party on the second phone line. The phone lines may also be used separately by the users of handset 101 and base station 103. For example, handset 101 may have a first phone call on the first phone line while base station 103 has a second phone call on the second phone line. In this situation, microprocessor 212 controls dual relay 250 to decouple the first and second phone lines.

Tip line 292 is also coupled to a ring detector 246 which signals microprocessor 212 when a ringing condition exists on the first phone line. Likewise, tip line 296 is coupled to a ring detector 246 which signals microprocessor 212 when a ringing condition exists on the second phone line. Microprocessor 212 may alert the user with audible and/or visual signals when the ringing condition exists on one of the phone lines. Tip line 292 is also coupled to a condition detector 232 which signals microprocessor 212 when a predetermined condition exists on the first phone line. Likewise, tip line 296 is coupled to a condition detector 234 which signals microprocessor 212 when a predetermined condition exists on the second phone line. First and second condition detectors 232, 234 may detect one or more predetermined conditions on the phone lines, for example, an on-hook condition or a hold condition.

Figure 3:
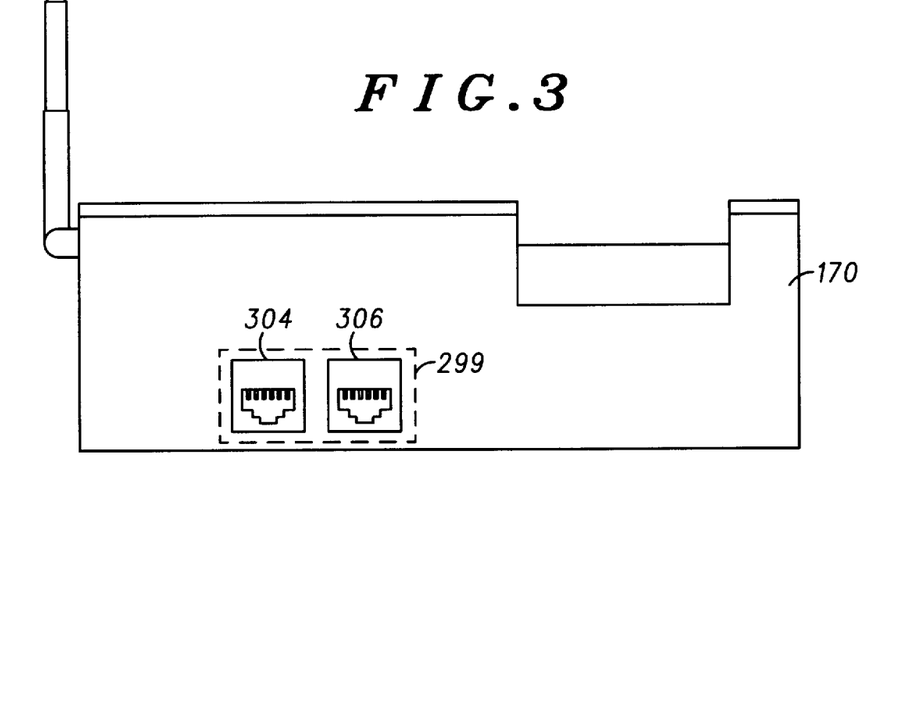
FIG. 3 is a perspective view of a rear panel 170 of base station 103 of FIG. 1.

FIG. 3 shows rear panel 170 of base station 103, where phone jack arrangement 299 is located. Phone jack arrangement 299 comprises a phone jack 304 and a phone jack 306, both coupled to phone line circuitry 270.

Figure 4:
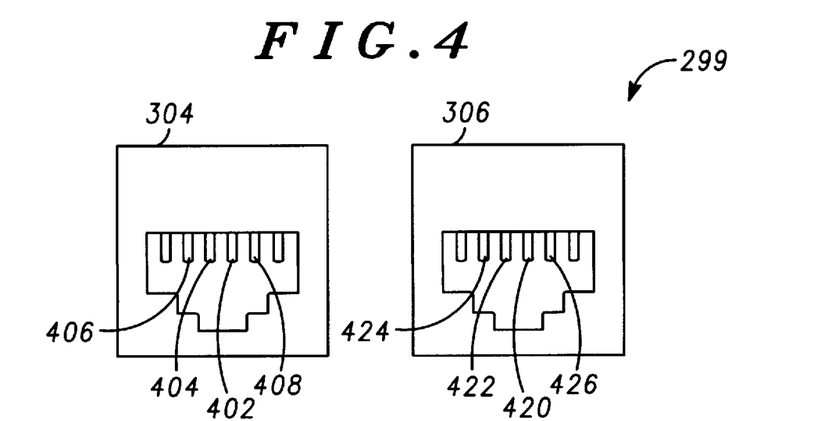
FIG. 4 is a perspective view of a phone jack arrangement 299 located at rear panel 170 of base station 103 of the telephone apparatus of FIG. 1.

FIG. 4 shows a close-up of phone jack arrangement 299. Both phone jacks 304, 306 comprise a plurality of contacts partially embodied within a connector housing. Phone jack 304 includes six contact receptacles adapted to receive electrical contacts, inner conductors 402, 404, and outer conductors 406, 408. The contacts of phone jack 304 are coupled to conductors that couple to tip and ring lines 292, 294. Phone jack 306 also includes six contact receptacles adapted to receive electrical contacts, inner conductors 420, 422, and outer conductors 424, 426. Some of the contacts of phone jack 306 are coupled to conductors that couple to tip and ring lines 296, 298.

To provide connections between the phone lines of base station 103 and land lines, a conventional telephone cord 139, shown partially in FIG. 1, may be used. Telephone cord 139 has a first end coupled to a first phone plug 135 and a second end coupled to a second phone plug (not visible), and may provide for a one-line or two-line phone connection. At least one phone line of base station 103 will be connected to a land line when the second phone plug of the telephone cord 139 is inserted into phone jack 304 (or phone jack 306) and when the first phone plug is inserted into a land line jack 137.

Figure 5:
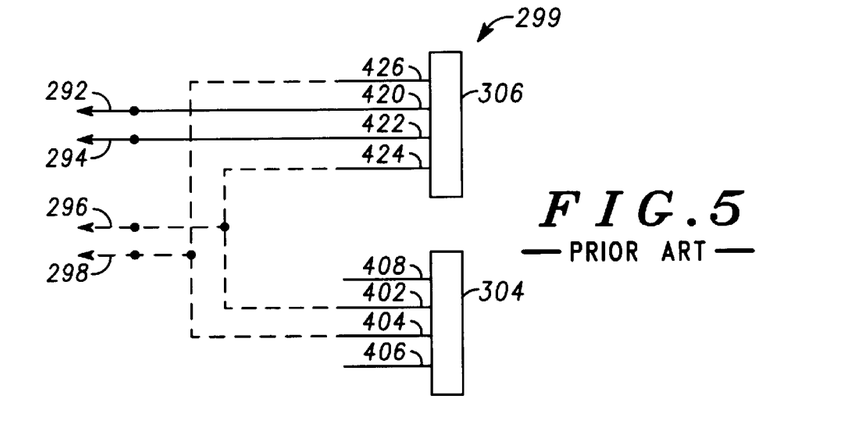
FIG. 5 is a wiring diagram of a conventional phone jack arrangement.

FIG. 5 shows a wiring diagram of a conventional phone jack arrangement. Inner conductors 420, 422 of phone jack 306 are coupled to tip and ring lines 292, 294, respectively, of the first phone line. Outer conductors 424, 426 of phone jack 306 are coupled to inner conductors 402, 404, respectively, and to tip and ring lines 296, 298, respectively, of the second phone line.

Figure 6:
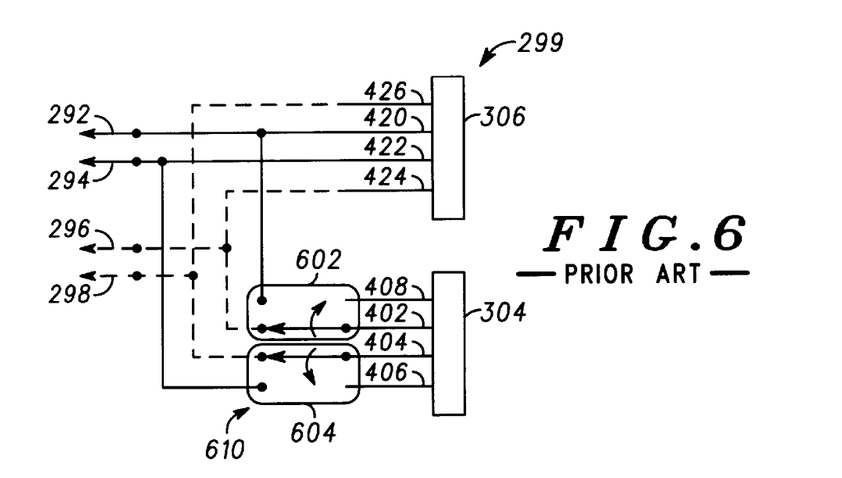
FIG. 6 is a wiring diagram of another conventional phone jack arrangement.

FIG. 6 shows a wiring diagram of another conventional phone jack arrangement. Inner conductors 420, 422 of phone jack 306 are coupled to tip and ring lines 292, 294, respectively, of the first phone line, while outer conductors 424, 426 of phone jack 306 are coupled to tip and ring lines 296, 298, respectively, of the second phone line. The phone jack arrangement herein includes a line switch 610 comprising a tip switch 602 and a ring switch 604. Tip switch 602 and ring switch 604 are responsive to a position of line switch 610. Inner conductors 402, 404 of phone jack 304 are coupled to tip switch 602 and ring switch 604, respectively. When line switch 610 is in a first position, a coupling is provided between inner conductors 402, 404 of phone jack 304 and inner conductors 424, 426 of phone jack 306, respectively. When line switch 610 is moved to a second position, a coupling is provided between inner conductors 402, 404 of phone jack 304 and inner conductors 420, 422 of phone jack 306, respectively.

Figure 7:
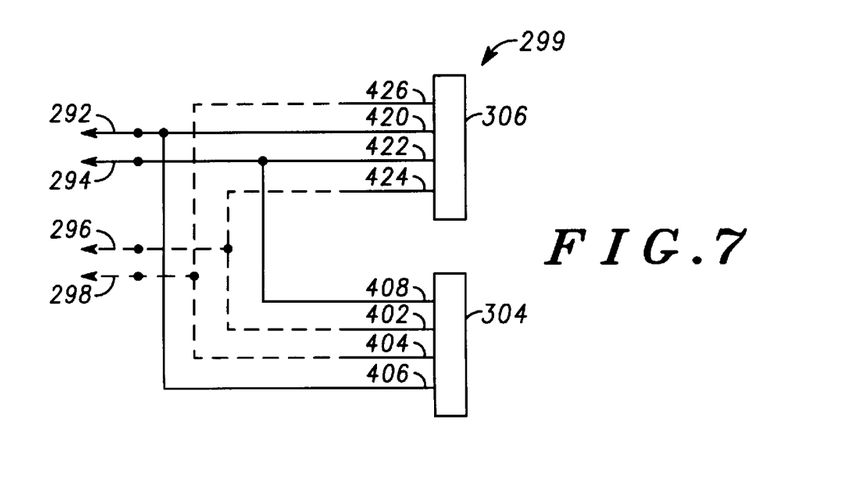
FIG. 7 is a wiring diagram of a phone jack arrangement in accordance with the present invention.

FIG. 7 shows a wiring diagram of a phone jack arrangement in accordance with the present invention. Inner conductors 420, 422 of phone jack 306 are coupled to outer conductors 406, 408 of phone jack 304, respectively, and to tip and ring lines 292, 294 of the first phone line, respectively. Outer conductors 424, 426 of phone jack 306 are coupled to the inner conductors 402, 404 of phone jack 304, respectively, and to tip and ring lines 296, 298 of the second phone line, respectively.

Figure 8:
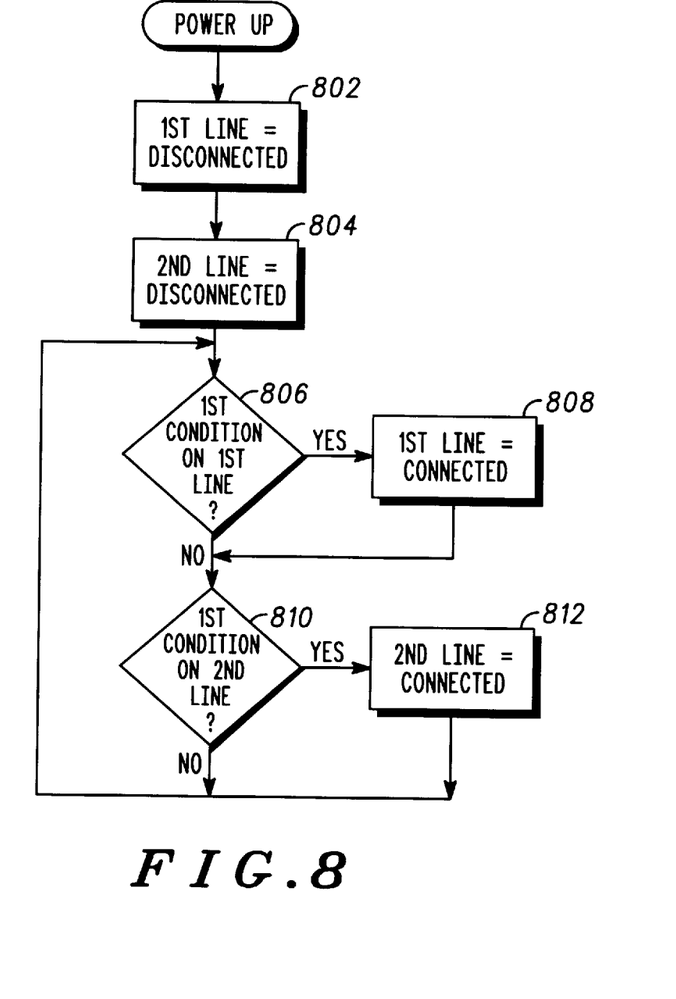
FIG. 8 is a process flowchart in accordance with the present invention for detecting phone line connections.

FIG. 8 shows a process flowchart for detecting connections between phone lines in a multi-line telephone apparatus and land lines. In the preferred embodiment, microprocessor 212 runs a software program that keeps track of a connection status of a first phone line and second phone line in the multi-line telephone apparatus. The connection status for each phone line may be "connected" or "disconnected." The method of detection begins with steps 802 and 804, where the software initially establishes both lines to be disconnected. Next, in step 806, the microprocessor 212 checks if a first condition exists on the first phone line.

The detection may be accomplished by monitoring condition detector 232 which provides a detection signal to microprocessor 212 when the first condition is detected on the first phone line. If the first condition exists on the first phone line, microprocessor 212 determines the connection status of the first phone line to be "connected" at step 808. At step 810, microprocessor 212 proceeds to check if the first condition exists on the second phone line. This may be done using condition detector 234 the same way condition detector 232 is used on the first phone line. If the first condition exists on the second phone line, microprocessor 212 determines the connection status of the second phone line to be "connected" at step 812. Microprocessor 212 then repeats the steps, starting at step 806, continuously rechecking the phone lines for the first condition.

In the preferred embodiment, the first condition is an on-hook condition. Condition detectors 232, 234 check if the voltages on the first and second phone lines meet a specified on-hook voltage. A typical on-hook voltage, given a proper operating voltage supplied from the equipment of the central office and a proper impedance of phone line circuitry 270, is about 50 volts. A typical off-hook voltage is 10 volts, and if no line is connected, 0 volts. Once the on-hook voltage condition is detected on one of phone lines, that phone line is deemed "connected," since the on-hook voltage condition would not likely occur unless the phone line was connected to a land line. The connection status is retained until the next multi-line telephone apparatus initialization.

In the preferred embodiment, condition detectors 232, 234 are the same detectors used to detect line access conditions in the multi-line telephone apparatus. Since every multi-line telephone apparatus needs to detect line access conditions to bring phone lines on- and off-hook, using the same condition detector eliminates the need for adding extra circuitry to detect no connection (0 volts) on the phone line.

Figure 9:
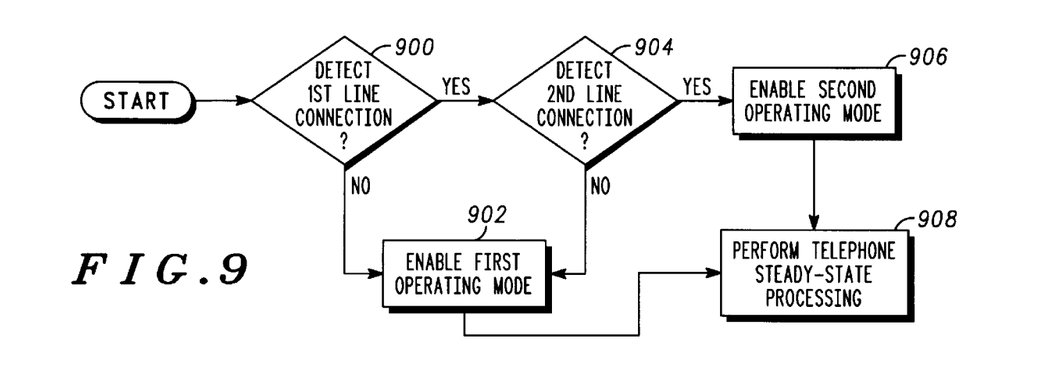
FIG. 9 is a process flowchart in accordance with the present invention for operating a telephone apparatus based on the detection of phone line connections.

FIG. 9 is a process flowchart describing a method in which a multi-line telephone apparatus may operate in one of a plurality of operating modes, according to the number of phone lines connected. The method begins at step 900, where microprocessor 212 determines whether a first connection exists on the first phone line. If the first connection does not exist, then microprocessor 212 enables a first operating mode at step 902. If the first connection does exist, then microprocessor 212 determines whether a second connection exists on the second phone line. If the second connection does not exist, then microprocessor 212 similarly enables the first operating mode at step 902. If the second connection does exist, then microprocessor 212 enables a second operating mode at step 906. Once the multi-line telephone apparatus has established a mode of operation, the multi-line telephone apparatus will perform steady-state operation according to the mode at step 908. The steps which determine whether a connection exists (steps 900 and 904) may include the method illustrated in FIG. 8.

The operating modes may have control of the features of the multi-line line telephone apparatus or its base station user interface 126. In the preferred embodiment, the first operating mode is a one-line operating mode and the second operating mode is a two-line operating mode.

For example, the one-line operating mode may disable the second line interface 142 of base station user interface 126 when the first connection exists but the second connection does not, and disable the first line interface 140 of base station user interface 126 when the second connection exists but the first connection does not. The two-line operating mode may keep both line interfaces 140, 142 of the user interface base station user interface 126 enabled for use of both phone lines. With this configuration, a multi-line telephone apparatus will not incorrectly and unnecessarily display the use of a phone line that is not connected for use. Also, when a line access condition is detected (i.e., the user attempts to access a phone line for operating use, for example, by opening cover element 107 in handset 101) in a multi-line telephone apparatus having only one phone line connected, a one-line operating mode may automatically select the one phone line that has the connection established, opposed to having the user unnecessarily manually select the phone line for operation.

Figure 10:
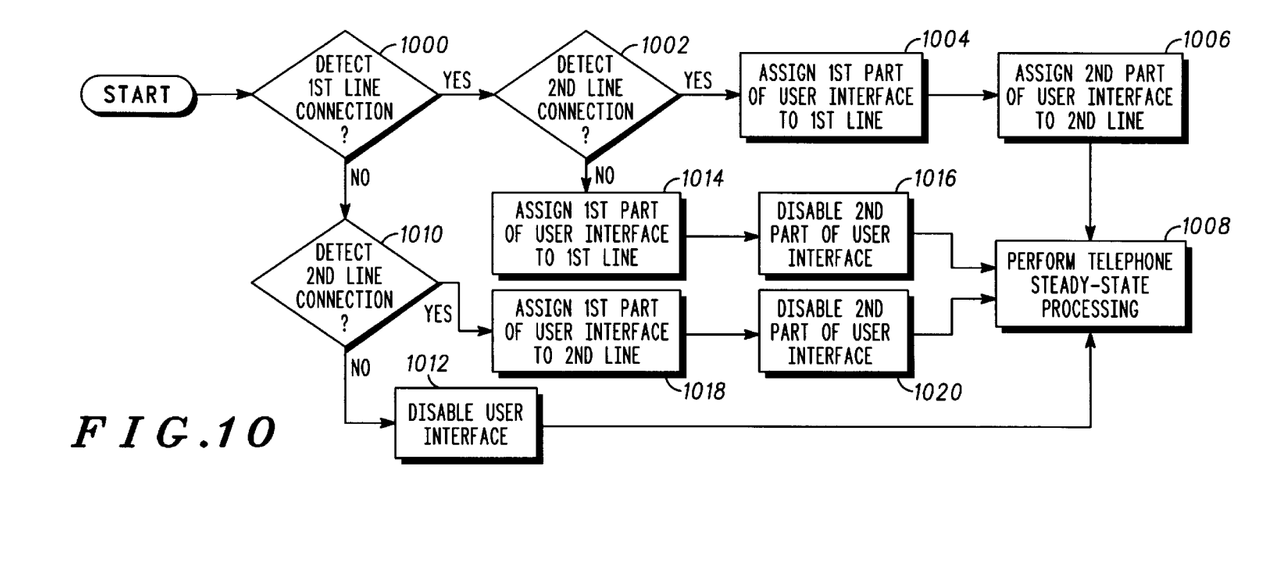
FIG. 10 is a process flowchart in accordance with the present invention for operating a base station user interface 126 of a telephone apparatus based on the detection of phone line connections.

A method of adapting base station user interface 126 according to phone line connections detected is shown in FIG. 10. In step 1000, microprocessor 212 checks if the first connection of the first phone line exists. If it does, at step 1002 microprocessor 212 proceeds to check if the second connection of the second phone line exists. If it does, then microprocessor 212 assigns the first line interface 140 of base station user interface 126 to use of the first phone line at step 1004, and assigns the second line interface 142 of base station user interface 126 to use of the second phone line at step 1006. At step 1002, if microprocessor 212 does not detect the second connection of the second phone line, microprocessor 212 assigns the first line interface 140 of base station user interface 126 to the first phone line at step 1014, and disables the second line interface 142 of base station user interface 126 at step 1016. At step 1000, if microprocessor 212 does not detect the first connection of the first phone line, microprocessor 212 proceeds to check if the second connection of the second phone line exists at step 1010. If it does, microprocessor 212 assigns the first line interface 140 of base station user interface 126 to the second phone line at step 1018, and disables the second line interface 142 of base station user interface 126 at step 1020. If the second connection of the second phone line does not exist at step 1010, and thus no phone line connections exist, then microprocessor 212 disables base station user interface 126. At step 1008, the multi-line telephone apparatus performs steady-state processing with the user interface assignments thus made. For example, steady-state operation may include flashing the first display 146 or processing LINE 1 key 144. The steps which determine whether a connection exists (steps 1000, 1002, and 1010) may include the method illustrated in FIG. 8.

The method operating base station user interface 126 as described is preferred over existing methods since confusion is minimized: user inputs corresponding to a disconnected phone line are not processed, and outputs corresponding to the line are not displayed. Additionally, when only the second phone line is connected, that line is mapped to the first line interface 140 of base station user interface 126 instead of the second line interface 142.

Alternate embodiments may vary according to the number of phone lines of the multi-line telephone apparatus and the application being sought. One variation of the method may be a one-line telephone apparatus capable of operating in a no-line operating mode and a one-line operating mode, where the no-line operating mode operates when the phone line is not connected and alerts the user of the lack of connection and/or denies processing of user inputs. Another variation of the method may be a multi-line telephone apparatus capable of operating more than two phone lines, where each connected phone line is mapped sequentially to the lowest-numbered available line interface of the user interface. For example, suppose a multi-line telephone apparatus had four line interfaces, similar to line interfaces 140 and 142 in FIG. 1, and provided for four phone lines. When all four land line connections exist, then the first phone line corresponds to the first line interface, the second phone line corresponds to the second line interface, etc. But if the second and fourth phone lines are the only lines that have connections to the land lines, the second phone line is assigned to the first line interface of the user interface, and the fourth phone line is assigned to the second line interface of the user interface. The advantage of this method is that it organizes the user interface of the multi-line telephone apparatus in a logical manner according to the connected phone lines available to the user.

Although the methods described thus far have involved base station user interface 126 of base station 103, they may similarly be applied to handset user interface 180 of handset 101.

Most multi-line telephone apparatuses require a manual selection of a desired phone line for operating use when making an outbound call or receiving an incoming call. This is often accomplished by selecting from a plurality of phone line switches in the multi-line telephone apparatus. Another step is usually required to operate the phone line, giving the multi-line telephone apparatus a line access condition. This is often accomplished by picking up the multi-line telephone apparatus receiver or opening a cover element in the multi-line telephone apparatus.

Conventional methods reveal a multi-line telephone apparatus that automatically selects one phone line from a plurality of phone lines for operating use upon the detection of a line access condition. The method is limited, however, in that the phone line selected is usually a fixed, default phone line.

A phone line chosen for operating use by the multi-line telephone apparatus upon detection of a line access condition may vary according to its operating mode. For example, a one-line operating mode in a two-line telephone apparatus may always select the one phone line having a connection present, whereas a two-line operating mode may select a predetermined phone line upon detection of a condition on one of the two phone lines, such as a first condition. The first condition may be a ringing condition, where the predetermined phone line selected is the line having the ringing condition. The first condition may also be an off-hook condition, where the predetermined phone line selected is the line not having the off-hook condition. Finally, the first condition may be a hold condition, where the predetermined phone line selected is the line not having the hold condition.

Figure 11:
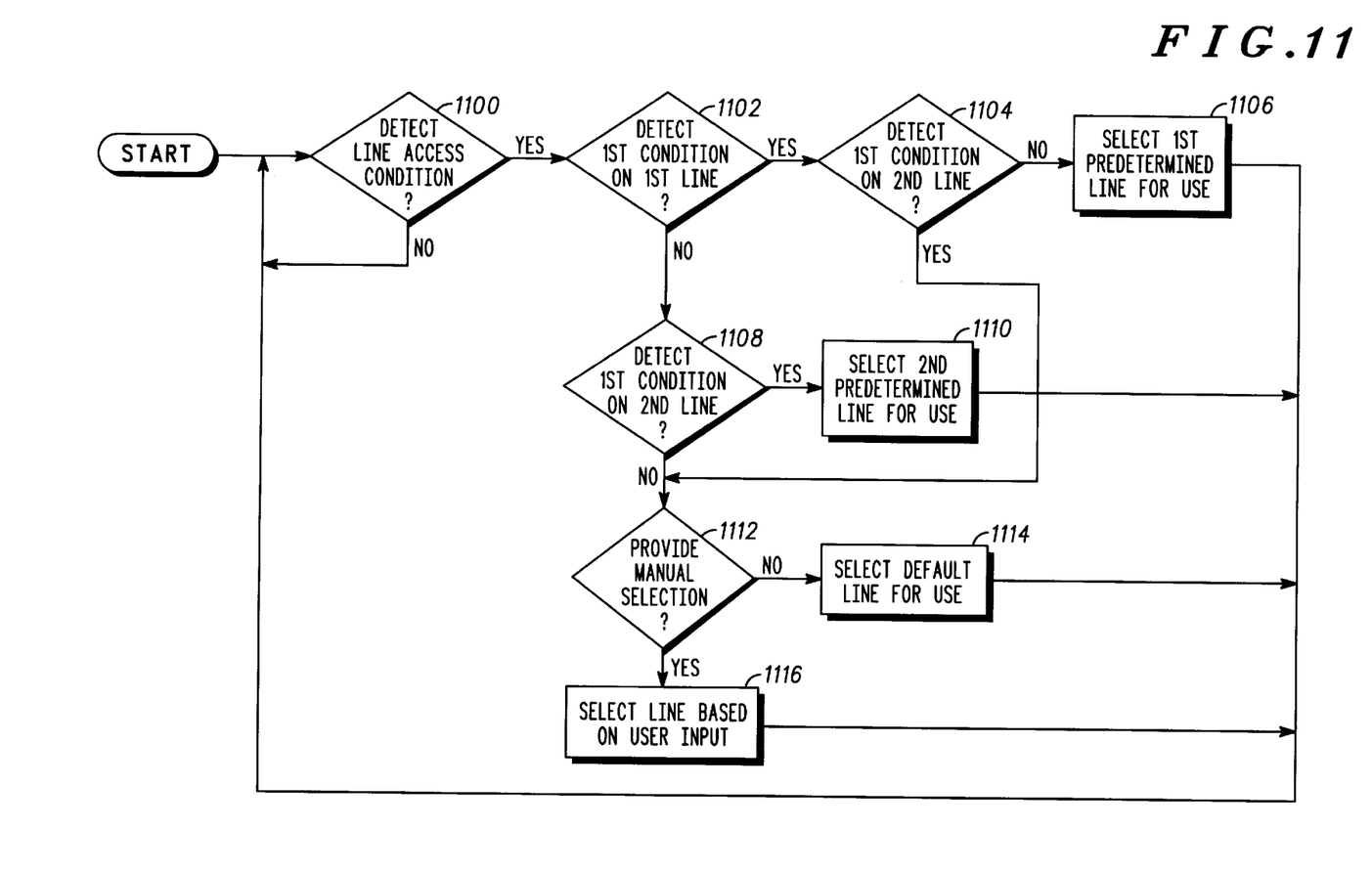
FIG. 11 is a process flowchart in accordance with the present invention for operating a telephone apparatus in a two-line operating mode.

FIG. 11 shows a method of selecting one phone line for operating use in a multi-line telephone apparatus. The method starts with step 1100, where microprocessor 212 determines if there is a line access condition present in the multi-line telephone apparatus. As stated above, this condition is ordinarily present when a receiver of the multi-line telephone apparatus is lifted from a base station or cover element 107 of handset 101 is opened, actions likely to occur when a user is attempting to access one of the phone lines to receive or place a call. If the line access condition is not present, microprocessor 212 continues checking for it, looping back to step 1100. If the line access condition does exist, the method proceeds to determine which phone line to select for operating use, starting at step 1102.

At step 1102, microprocessor 212 determines if a first condition exists on the first phone line. The first condition may be a ringing condition detected from ring detector 246, a hold condition detected from condition detector 232, or an on-hook condition also detected from condition detector 232. If the first condition exists, the method proceeds at step 1104, where microprocessor 212 determines if the first condition exists on a second phone line. If the first condition does not exist on the second phone line, the multi-line telephone apparatus selects a first predetermined phone line for operating use at step 1106. Back at step 1102, if the first condition does not exist on the first phone line, microprocessor 212 determines if the first condition exists on the second phone line at step 1108. If the first condition does exist on the second phone line, then the multi-line telephone apparatus selects a second predetermined phone line for operating use at step 1110.

Following step 1104, if the first condition exists on the second phone line, and step 1108, if the first condition does not exist on the second phone line, the method arrives at step 1112. At this step, the first condition either exists on both phone lines or on neither phone line, and microprocessor 212 determines whether a manual selection of one of the phone lines is required. If manual selection is required, one phone line based on a user input from line interfaces 140, 142 is selected for operating use at step 1116. If manual selection is not required, then a default phone line is selected at step 1114. In the preferred embodiment, the default phone line is the first phone line.

Once the phone line is selected through one of steps 1106, 1110, 1114, and 1116, the method proceeds back to step 1100, starting the process over again.

In FIG. 11, the existence and the order of step 1100 is preferred but not absolutely necessary since the selection of a phone line for operating use may occur without, or prior to, the detection of a line access condition. Also, the order in which the phone lines are checked for detection of the first condition is not important. For example, step 1102 may check the second phone line while steps 1104 and 1108 check the first phone line. The steps which determine whether a connection exists (steps 1102, 1104, and 1108) may include the method illustrated in FIG. 8.

Figure 12:
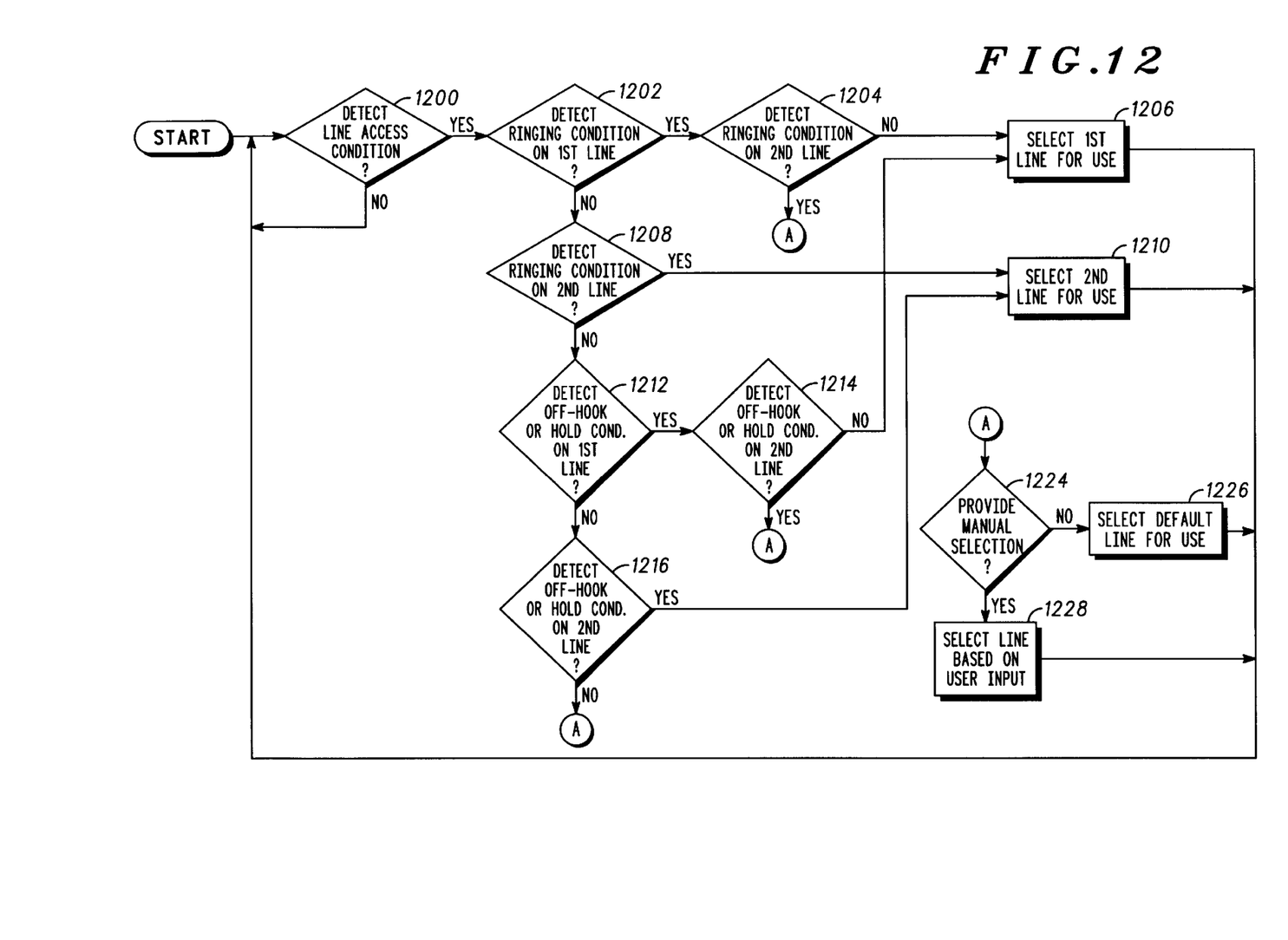
FIG. 12 is a process flowchart in accordance with the present invention for operating a telephone apparatus in another two-line operating mode.

FIG. 12 shows a process flowchart of a preferred embodiment of the present invention. The method starts with step 1200, where microprocessor 212 determines if there is a line access condition present in the multi-line telephone apparatus. If the line access condition is not present, microprocessor 212 continues checking for it, looping back to step 1200. If the line access condition does exist, the method proceeds to determine which phone line to select for operating use, starting at step 1202.

At step 1202, microprocessor 212 determines if a ringing condition exists on the first phone line from ring detector 246. If the ringing condition exists on the first phone line, the method proceeds at step 1204, where microprocessor 212 determines if the ringing condition exists on the second phone line from ring detector 248. If the ringing condition does not exist on the second phone line, the multi-line telephone apparatus selects the first phone line for operating use at step 1206. Back at step 1202, if the ringing condition does not exist on the first phone line, microprocessor 212 determines if the ringing condition exists on the second phone line at step 1208. If the ringing condition does exist on the second phone line, then the multi-line telephone apparatus selects the second phone line for operating use at step 1210. Up to this point, the method provides an automatic selection of a ringing phone line for operating use in the two-line telephone apparatus.

A hold or off-hook condition may also provide a basis for the selection of one of the phone lines. At step 1212, microprocessor 212 determines if an off-hook condition exists on the first phone line from condition detector 232. If the off-hook condition exists on the first phone line, the method proceeds at step 1214, where microprocessor 212 determines if the off-hook condition exists on the second phone line from condition detector 234. If the off-hook condition does not exist on the second phone line, the multi-line telephone apparatus selects the first phone line for operating use at step 1206. Back at step 1212, if the off-hook condition does not exist on the first phone line, microprocessor 212 determines if the off-hook condition exists on the second phone line at step 1216. If the off-hook condition does exist on the second phone line, then the multi-line telephone apparatus selects the first phone line for operating use at step 1210. Therefore, the method provides an automatic selection of a phone line that is ringing and not off-hook or on hold in the two-line telephone apparatus for operating use.

Following step 1204 when the ringing condition exists on the second phone line, step 1214 when the off-hook or hold conditions exist on the second phone line, and step 1216 when the off-hook or hold conditions do not exist on the second phone line, the method arrives at step 1224 through connector A. At this step, one of the conditions exist on both phone lines or no conditions exist on either phone line, and microprocessor 212 determines whether a manual selection of one of the phone lines is required. If manual selection is required, one phone line based on a user input from a user interface 126, 150, 113 is selected for operating use at step 1228. If manual selection is not required, then a default phone line is selected at step 1226. In the preferred embodiment, the default phone line is the first phone line.

Once the phone line is selected from one of steps 1206, 1210, 1226, and 1228, the method proceeds back to step 1200, where the method starts over again, determining whether another line access condition exists.

Although preferred, step 1200 of FIG. 12 is not required and the order in which it lies is not critical, that is, the selection of a phone line for operating use may occur without, or prior to, the detection of a line access condition. Also, the order in which the phone lines are checked for detection of any of the conditions is not important. For example, step 1202 may check the second phone line while steps 1204 and 1208 check the first phone line, etc. Finally, the method as shown provides a phone line selection based on conditions arranged in a hierarchical order, namely (highest to lowest priority): ringing, off-hook or on hold. A method may alternatively provide a different hierarchy of conditions.

We claim:

1. A method of controlling operation of a user interface of a telephone apparatus, the user interface including a first key and a second key, the user interface controlled by a processor to operate in accordance with one of a single-line telephone configuration and a. two-line telephone configuration, the method comprising the steps of:

detecting if a first phone line of the telephone apparatus is connected to a first land line;

detecting if a second phone line of the telephone apparatus is connected to a second land line;

controlling the user interface to operate in accordance with the single-line telephone configuration in response to one phone line of the first and the second phone lines not being connected, the single-line telephone configuration disabling the second key of control of the one phone line; and controlling the user interface to operate in accordance with the two-line telephone configuration in response to both of the first and the second phone lines being connected, the two-line telephone configuration engaging the first key to control the first phone line and engaging the second key to control the second phone line.

2. The method according to claim 1, wherein the steps of detecting include the steps of detecting on-hook conditions of the first and the second phone lines.

3. A method of controlling operation of a multi-line telephone apparatus, said multi-line telephone apparatus including a first display and a first line access switch, the method comprising the steps of:

(a) detecting a first connection between a first phone line of said multi-line telephone apparatus and a first land line;

(b) detecting a second connection between a second phone line of said multi-line telephone apparatus and a second land line;

(c) enabling a single-line operating mode in response to only one of step (a) and (b), the single-line operating mode assigning said first display and said first line access switch to correspond to use of the first phone line when the first connection exists and the second connection does not exist, single-line operating mode assigning said first display and said first line access switch to correspond to use of the second phone line when the second connection exists and the first connection does not exist; and (d) enabling a two-line operating mode in response to both of steps (a) and (b), the two-line operating mode corresponding to use of both the first phone line and the second phone line.

4. A method of configuring a user interface in a multi-line telephone apparatus, the method comprising the steps of:

detecting if a first connection to a first land line exists;

detecting if a second connection to a second land line exists;

assigning a first part of the user interface for use with the first land line when the first connection exists and the second connection does not exist;

assigning the first part of the user interface for use with the second land line when the second connection exists and the first connection does not exist; and assigning the first part of the user interface for use with the first land line and assigning the second part of the user interface for use with the second land line when both the first connection and second connection exist.

5. The method according to claim 4, wherein the step of detecting if the first connection to the first land line exists includes the step of detecting if an on-hook condition associated with the first land line exists and the step of detecting if the second connection to the second land line exists includes detecting if an on-hook condition associated with the second land line exists.

6. The method according to claim 4, wherein the steps of assigning include the step of disabling the second part of the user interface when only one of the first and the second connections exist.

7. A telephone apparatus, comprising:

a housing;

a user interface, said user interface carried on said housing and including a first key and a second key;

a connection interface, said connection interface carried on said housing and configured for coupling with a first land line and a second land line;

line detection circuitry, said line detection circuitry disposed in said housing and coupled to said connection interface; and a processor, said processor coupled to said line detection circuitry and to said user interface, said processor to engage said first key for on-hook and off-hook control of the first land line in response to said connection interface being coupled to the first land line but not the second land line, said processor to engage said first key for on-hook and off-hook control of the second land line in response to said connection interface being coupled to the second land line but not the first land line.

* * * * *